(No Model.)

E. H. HOLLISTER.
THILL COUPLING.

No. 303,851. Patented Aug. 19, 1884.

WITNESSES:
John G. Deemer
C. Sedgwick

INVENTOR:
E. H. Hollister
BY Munn & Co
ATTORNEYS.

UNITED STATES PATENT OFFICE.

EDWARD H. HOLLISTER, OF KENOSHA, WISCONSIN.

THILL-COUPLING.

SPECIFICATION forming part of Letters Patent No. 303,851, dated August 19, 1884.

Application filed February 14, 1884. (No model.)

*To all whom it may concern:*

Be it known that I, EDWARD H. HOLLISTER, of Kenosha, in the county of Kenosha, and State of Wisconsin, have invented certain new and useful Improvements in Pole-Shackles, of which the following is a full, clear, and exact description.

This invention relates to shaft or pole shackles for wagons and other vehicles; and it consists in a shackle of novel construction whereby increased convenience is afforded for shifting or exchanging the pole or shafts of the vehicle, substantially as hereinafter described.

Reference is to be had to the accompanying drawings, forming part of this specification, in which similar letters of reference indicate corresponding parts in both the figures.

Figure 1:
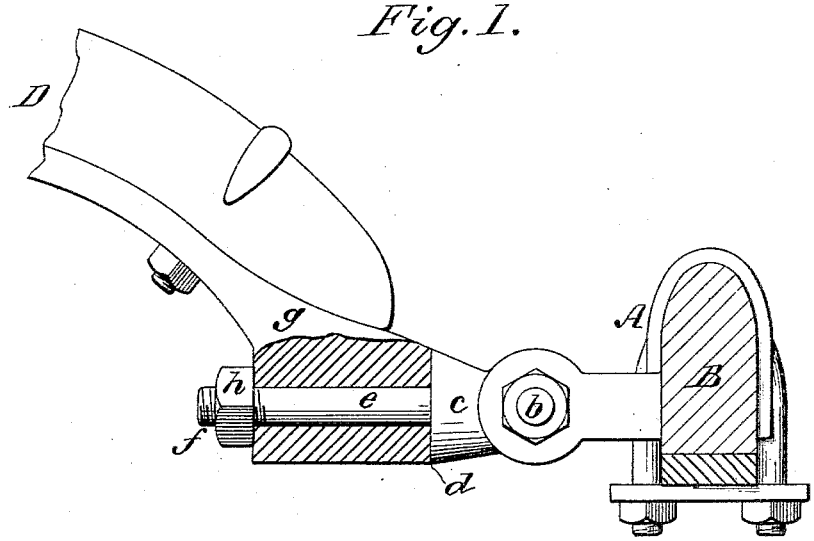
Figure 2:
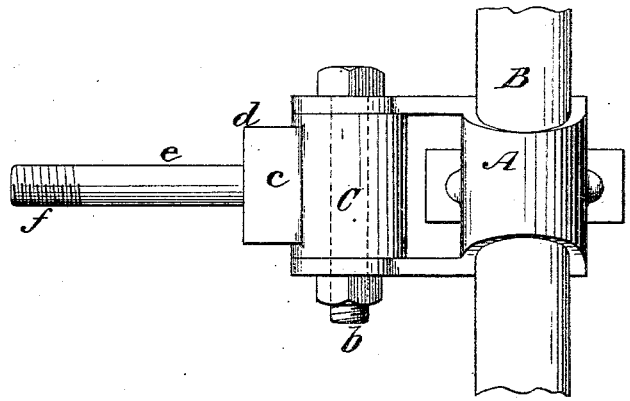

Figure 1 represents a partly sectional side view of my improved shackle applied to the axle and pole or one of the shafts of a vehicle, and Fig. 2 a plan view with the pole or shaft removed.

A indicates the usual clip of a shaft or pole shackle, secured in the ordinary manner to the front axle, B, of a wagon or other vehicle.

C is the eye-piece of the shackle, arranged to fit within the jaws of the clip, and connected therewith by the bolt $b$, passing through said jaws and eye-piece, and secured by a nut or otherwise. This eye-piece is constructed to form a short projection, $c$, in front, terminating in a shoulder, $d$, at a point some little distance from the eye, and from thence is extended outward in front in the shape of a bolt, $e$, having a screw-thread, $f$, upon its outer end. This bolt-extension of the shackle passes through a hole in the iron $g$ of the shaft or pole D, and is firmly secured in place by a nut, $h$, on the screw-threaded end of the bolt $e$, making, as it were, a continuous piece of the shaft or pole iron with the eye-piece of the shackle. By this construction of the shackle I am enabled to shift or exchange the pole or shafts of a vehicle without removing the eye-piece C from the clip of the shackle by simply unscrewing or taking off the nut $h$, so that the bolt $e$ will be free to slip out of connection with the shaft or pole.

Having thus described my invention, what I claim as new, and desire to secure by Letters Patent, is—

1. A shaft or pole shackle for vehicles, having an eye-piece, C, arranged to engage with the clip on the axle, and constructed with a shouldered front portion, $c$, terminating in a screw-threaded bolt-extension, $e$, for ready connection with the shaft or pole and disconnection therefrom, substantially as specified.

2. The combination, with the axle-clip A and bolt $b$, of the eye-piece C, constructed with a shouldered front portion, $c$, and screw-threaded bolt-extension $e$, whereby the shaft or pole may be shifted or exchanged without removing the eye-piece from the clip, essentially as shown and described.

EDWARD H. HOLLISTER.

Witnesses:
J. S. HOLLISTER,
W. H. WILLSON.